Patented Sept. 2, 1941

2,254,241

UNITED STATES PATENT OFFICE 2,254,241

TREATMENT OF MILK WASTE

Ernest E. Pittman and Robert Roger Bottoms, Louisville, Ky., assignors to The Girdler Corporation, Louisville, Ky., a corporation of Delaware No Drawing. Application September 16, 1938, Serial No. 230,258

10 Claims. (Cl. 99—54)

This invention relates to the treatment of milk waste materials and involves a method which serves the dual purpose of removing from such milk waste one or more useful by-products and at the same time reducing the problem of waste disposal customarily connected with the processing of milk.

During the manufacture of casein, cottage cheese, rennet cheese, and similar materials derived from milk, large quantities of liquid whey are produced as waste products and during the manufacture of butter large quantities of buttermilk are obtained which may be in excess of market needs.

Moreover, large quantities of skim milk are frequently available at dairies for recovery processes at those times when an excess of skim milk is found to exist.

It has long been known that whey has a relatively high sugar content and several processes have been developed for the recovery of this milk sugar from the waste whey. However, such processes have many disadvantages including expensive evaporation, the use of cumbersome apparatus, high expense of operation, and the inability to produce a product which is at all times satisfactory. In the event that the large quantities of whey are not evaporated for the purpose of recovering such sugar or are not otherwise treated, a very serious problem of disposal is found to exist due to the protein and sugar contents and to a lesser extent the fat content of the whey, which will pollute water streams into which the whey is directed and which will impose a high oxygen demand on such streams.

Similarly in disposing of excess butter milk, it has been customary for the operator to either concentrate the butter milk into a semi-solid feed material by expensive evaporation or to discard such excess into disposal channels with the result that a heavy load is placed upon the sewage disposal facilities or else a nuisance is created. Similarly, the disposition of excess quantities of skim milk often presents a serious problem to the dairy industry when such milk is not dried or concentrated by the usual evaporation process.

It is found that whey, as it leaves the casein or other manufacturing processes, contains about seven percent total solids suitable for use as a valuable feed or ingredient of feed for poultry or livestock. Included within the solids of the whey are about 0.38% of fat, about 0.96% of protein, small percentages of mineral salts and a milk sugar content of from 4 to 6 per cent. The protein may be in the form of one or more of the following types, namely, whey casein, albumen, water soluble vitamin B, water soluble vitamin C, diastase, gelactase, cotalase, peroxidase, and reductase. Such proteins if allowed to ferment present a substantial nuisance and create a major problem of disposal.

The milk sugar or lactose content is of a fermentable character in the presence of lactic acid bacteria and if drained out as a waste will likewise create a nuisance over a period of time. To a lesser extent the fat content will also create a nuisance as it slowly decomposes and undergoes a breaking down of the glycerides therein.

One of the objects of the invention is the provision of a process for precipitating protein and/or fat materials from a milk waste material, such as whey, buttermilk, skim milk and the like.

Another object is the provision of a process for separating and recovering as useful by-products the solids contained in a milk waste material.

Another object is the treating of whey materials in order to form useful by-products therefrom.

Another object is the treating of butter milk waste material in order to form a useful by-product consisting of a buttermilk precipitate.

Another object is the provision of a process for treating skim milk in order to precipitate and recover therefrom a useful by-product.

Further objects include the recovery of a milk sugar by-product from a milk waste; the recovery of an alcohol by-product from a milk waste; the recovery of lactic acid from a milk waste; the recovery of a poultry or livestock feed from a milk waste; the reduction of the solid content of a milk waste so as to reduce the problem of disposal of such waste, and the new and important use of an inexpensive precipitation agent for accomplishing the several objects of the invention.

Due to the fact that the solids of the average milk waste are in suspension or solution and cannot readily be separated from the liquid by means of conventional filtration or centrifuging, this invention provides as an important step of its process the use of a colloidal material having the property of forming a precipitate of the milk waste solids prior to a separation stage.

We have found that the colloidal earth material, bentonite, when employed in accordance with our teaching, is well suited for this purpose.

Bentonite, which forms a stable colloidal suspension in water, has been found to be well adapted for use upon many diverse forms of milk waste.

Since bentonite has neither an acid nor an alkaline character and since it apparently exerts only a physical action upon the material under treatment and appears to be entirely devoid of chemical activity therewith, the by-products recovered are found to be of superior quality for feed purposes. The presence of the relatively small amount of the inert clay is actually an aid to the feed since it contains certain desirable mineral salts of the same general nature as the salts native to the milk itself.

In carrying out our improved process the following procedure may be followed although it will be obvious that variations therein may be employed without departing from the invention.

The milk waste delivered from a manufacturing process at the usual temperature, which may be in the neighborhood of 30° C. is directed into a mixing tank and agitated in any suitable manner. Such waste may be delivered either continuously or in batches and will require no preliminary treatment, such as settling, screening, chemical processing or the like, as is now the case in many of the present recovery processes. Assuming that whey from a cheese manufacturing process is the waste to be treated, a slurry of bentonite, preferably aged for about 24 hours and made in the proportion of about one part dry bentonite to about fifteen parts water and preheated to a temperature of about 40° C., is then mixed with said whey and the entire mixture held at a temperature of about 100° C. for a short period, for instance, about twenty minutes. Heating to a lower temperature for a longer period may be employed or heating may be eliminated and satisfactory results may be accomplished although the precipitate may not form as rapidly. Preferably the bentonite slurry is mixed with the milk waste such as whey in the proportion of about one part of slurry to ten parts whey. In the treatment of butter milk the slurry-butter milk ratio may be about 1:4, while in the treatment of skim milk the ratio may be about 1:3.

During this time the coloidal bentonite, which has a characteristic of causing the formation of an amorphous jell or precipitate is permitted to complete its characteristic action. It is thought that the protein material found in the waste may have a positive potential and that the negative potential of the bentonite molecules aided by the characteristic Brownian movement of the bentonite molecules or particles in suspension are the reason for this phenomenon. Following the formation of the white colored jell in the mixture of the bentonite and liquid whey a marked breaking of this jell develops after a period of time with the result that a gradual settling of the precipitate begins to take place leaving a clear supernatant liquid. If desired the supernatant liquid having a protein content of about .06% and a sugar content of about 4% can be decanted from the mixing vat and led away for further treatment. When it is desired to recover the milk sugar from this liquid any suitable evaporation process may be used and a superior product unadulaterated with fat or protein material will be derived therefrom as hereinafter set forth. After the removal of the supernatant liquid the remaining precipitate and cloudy liquid may be directed into a suitable separation apparatus, such as a centrifuge or an efficient type of filtering mechanism. Obviously the entire mass of liquid and precipitate may be passed through the separator without the preliminary decantation and when so done it is found that the protein and sugar contents of the liquid effluent is unchanged over that secured in decantation.

In passing through this separation step a filter cake of whey solids containing a small proportion of bentonite will be obtained and this material forms an important by-product of the milk waste.

The liquid separated from the filter cake is then mixed with the supernatant liquid when that preliminary step is used and is directed to any desired disposal point or to a later recovery process. The filter cake having a high protein content and with a relatively low moisture content may be used directly as a wet feed, may be mixed with other ingredients or may be dried or otherwise treated to form the intended end product. For example, in the treatment of whey by this process, this end product may be a moist feed well adapted for poultry or stock feeding. In the treatment of butter milk the end product may be a semi-solid butter milk such as now prepared by expensive concentration methods and in the treatment of skim milk the end product may be a moist cake containing casein as well as the other protein and fat solids derived in the whey treatment.

The liquid effluent separated by the above described process has a sugar content of appreciable proportions. The minor quantity of bentonite which passes out with the liquid waste will not objectionably contaminate the waste and due to its chemically inert nature will not interfere with any subsequent treatment. Several alternatives for utilization of this effluent are available to the user and involve further features of our invention.

When lactose or milk sugar is to be recovered the waste effluent may be evaporated by conventional apparatus and methods, to form milk sugar as a second by-product of the original waste.

When desired, alcohol can be produced as a by-product from the waste effluent by fermentation of the sugar by means of yeast and in accordance with conventional methods. If alcohol is to be produced we may seed the whey with yeast and then after the sugar has fermented, treat with slurry to remove the protein and yeast. The alcohol may be removed before or after the treatment with bentonite slurry. Liquid remaining can then be run into a sewer stream or be otherwise disposed of.

As a further alternative, lactic acid can be produced as a by-product through treatment of the waste effluent by fermentation with lactic acid bacteria. Such a process could well be carried out by the conventional methods.

In the production of milk sugar or lactic acid in accordance with the foregoing no liquid waste would remain for later disposition after evaporation of the water, and no problem of disposal would be had. An important advantage of our invention, therefore, would reside in the production of a superior milk sugar, alcohol or lactic acid by-product uncontaminated by the protein or fat content normally found in the liquid residue from a prior separation step. Likewise a further important advantage resides in the recovery of a larger amount of the filter cake by-product with a higher protein content.

However, as is frequently the case with smaller dairies in which the production of milk sugar, alcohol or lactic acid as secondary by-products is not economically feasible the invention has an important advantage in that the waste effluent from the filter cake separation can be run directly into disposal channels without creating a substantial nuisance. When the more easily decomposable proteins and fats of the whey, skim milk or buttermilk are removed as taught herein, the milk sugar decomposition proceeds comparatively slowly and does not throw an excess BOD requirement on the disposal channels into which it is directed, and does not give rise to offensive odors as is the case where the fats and nitrogenous matters decompose. As a consequence, the process for treating milk wastes in accordance with our invention produces a valuable by-product which can be recovered, and simultaneously with its recovery the disposal problem of the waste is reduced to a point acceptable to health authorities.

Furthermore, the invention teaches the recovery whenever desired of certain secondary by-products, the recovery of which results in the complete elimination of the disposal problem.

In this way the invention is adaptable to conditions wherein the requirements of the health authorities may be stringent, lax or reasonable and wherein the invention may be applied to all types of milk product establishments regardless of size or of the type of by-products being produced.

Having thus described our invention, what we claim as new and desire to secure by Letters Patent is:

1. The method of treating milk waste materials including precipitating the protein and fat solids of a milk waste in the presence of bentonite, separating the precipitate from the liquid effluent and utilizing said separated precipitate as a milk waste by-product.

2. The method of reducing the BOD values of a milk waste material including treating the waste with bentonite, precipitating the protein and fat solids from the liquid waste, and separating said precipitate from the liquid waste in order to form a liquid waste of reduced BOD values.

3. The method of recovering valuable by-products from milk waste materials including precipitating the fat and protein solids from said waste by means of bentonite, separating the precipitate to form a useful by-product, and fermenting the effluent liquid to convert the milk sugar thereof into alcohol as a second by-product of the milk waste.

4. The method of recovering valuable by-products from liquid milk waste materials including precipitating the fat and protein solids from said waste in heated condition by means of bentonite, fermenting the liquid to convert the milk sugar thereof into lactic acid and separately removing the precipitate and the lactic acid.

5. The method of treating milk waste materials including mixing bentonite with the material, heating the mixture to approximately 100° C. and forming a precipitate of bentonite and proteinaceous milk material, and removing the precipitate.

6. The method of treating whey including mixing a slurry of bentonite with the whey in approximately the proportions of one part slurry to ten parts whey, heating the mixture to approximately 100° C. and forming a precipitate of bentonite and proteinaceous milk material, and separating the precipitate.

7. The method of treating milk waste liquids which includes mixing a slurry of bentonite having about one part bentonite to fifteen parts water, with said liquid in the proportion of one part slurry to three to ten parts of liquid to form a precipitate of the bentonite and milk waste solids, and separating said precipitate.

8. The method of treating milk waste liquids which includes mixing a slurry of bentonite having about one part bentonite to fifteen parts water, with said liquid in the proportion of one part slurry to three to ten parts of liquid, heating the mixture to about 100° C. and removing the resulting precipitate of bentonite and waste solids.

9. The method of recovering valuable by-products from liquid milk waste materials, including fermenting the materials to convert the milk sugar thereof into alcohol as a by-product, precipitating the fat, protein and yeast solids from the residual waste materials by means of a colloidal suspension of bentonite, and separating said precipitate to form a second by-product.

10. The method of recovering valuable by-products from liquid milk waste materials, including fermenting the materials to convert the milk sugar thereof into lactic acid as a by-product, precipitating the fat and protein solids from the residual waste materials by means of a colloidal suspension of bentonite, and separating said precipitate to form a second by-product.

ERNEST E. PITTMAN.
ROBERT ROGER BOTTOMS.